United States Patent
Baek

(10) Patent No.: US 12,434,699 B2
(45) Date of Patent: Oct. 7, 2025

(54) VEHICLE CONTROL SYSTEM AND METHOD

(71) Applicant: HL KLEMOVE CORP., Incheon (KR)

(72) Inventor: Hyunwoo Baek, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 265 days.

(21) Appl. No.: 18/110,917

(22) Filed: Feb. 17, 2023

(65) Prior Publication Data

US 2023/0256968 A1 Aug. 17, 2023

(30) Foreign Application Priority Data

Feb. 17, 2022 (KR) .......................... 10-2022-0020668

(51) Int. Cl.
*B60W 30/16* (2020.01)
*B60W 50/14* (2020.01)

(52) U.S. Cl.
CPC ............ *B60W 30/16* (2013.01); *B60W 50/14* (2013.01); *B60W 2520/10* (2013.01); *B60W 2554/402* (2020.02); *B60W 2554/4041* (2020.02); *B60W 2554/801* (2020.02); *B60W 2554/802* (2020.02); *B60W 2754/30* (2020.02)

(58) Field of Classification Search
CPC .............................. B60W 30/16; B60W 50/14
See application file for complete search history.

(56) References Cited

U.S. PATENT DOCUMENTS

| | | | | |
|---|---|---|---|---|
| 2009/0096598 | A1* | 4/2009 | Tengler | G08G 1/0965 340/453 |
| 2009/0299633 | A1* | 12/2009 | Hawes | B60R 21/0134 359/350 |
| 2013/0222592 | A1* | 8/2013 | Gieseke | G08G 1/096708 348/148 |
| 2014/0358324 | A1* | 12/2014 | Sagar | G08G 1/164 701/1 |
| 2020/0027355 | A1* | 1/2020 | Sujan | H04W 4/46 |

(Continued)

FOREIGN PATENT DOCUMENTS

| | | |
|---|---|---|
| JP | 2006-38697 | 2/2006 |
| JP | 2006-88770 | 4/2006 |
| KR | 10-2015-0067682 | 6/2015 |

(Continued)

OTHER PUBLICATIONS

Office Action (2nd) dated Aug. 8, 2024 for Korean Patent Application No. 10-2022-0020668 and its English translation provided by Applicant's foreign counsel.

(Continued)

*Primary Examiner* — Seth A Silverman
(74) *Attorney, Agent, or Firm* — WOMBLE BOND DICKINSON (US) LLP

(57) ABSTRACT

Disclosed herein are a vehicle control system and method. According to an aspect of the present disclosure, the vehicle control method includes detecting an electric mobility vehicle around a host vehicle to control an inter-vehicle distance between the host vehicle driven by a driver and the electric mobility vehicle, upon detecting the electric mobility vehicle, determining whether the electric mobility vehicle is present in a region of interest, and controlling the host vehicle to maintain a target inter-vehicle distance to the electric mobility vehicle.

14 Claims, 10 Drawing Sheets

(56) References Cited

U.S. PATENT DOCUMENTS

2020/0249699 A1* 8/2020 Kim .................... G05D 1/0295

FOREIGN PATENT DOCUMENTS

| KR | 10-2018-0065585 | 6/2018 |
| KR | 10-2019-0035255 | 4/2019 |
| KR | 10-2020-0128471 | 11/2020 |

OTHER PUBLICATIONS

Office Action dated Dec. 11, 2023 for Korean Patent Application No. 10-2022-0020668 and its English translation from Global Dossier.

* cited by examiner

VEHICLE CONTROL SYSTEM AND METHOD

CROSS-REFERENCE TO RELATED APPLICATION

This application claims the benefit of Korean Patent Application No. 10-2022-0020668, filed on Feb. 17, 2022 in the Korean Intellectual Property Office, the disclosure of which is incorporated herein by reference.

BACKGROUND

1. Field

Embodiments of the present disclosure relate to a vehicle control system and method, and more particularly, to a vehicle control system and method capable of adjusting an inter-vehicle distance between a vehicle and an electric mobility vehicle such as an electric kickboard.

2. Description of the Related Art

Recently, electric mobility vehicles have become popular, and thus accidents between vehicles and electric mobility vehicles are increasing. The use of such an electric mobility vehicle on a sidewalk and a bicycle road is legally prohibited for safety reasons. Therefore, users who use electric mobility vehicles should use electric mobility vehicles on a road. However, when an electric mobility vehicle is used on a road, there is a problem that the safety of a user who uses the electric mobility vehicle may be threatened.

Since an electric mobility vehicle is smaller than a general vehicle and thus can quickly turn, it is not easy to predict the movement of the electric mobility vehicle. Furthermore, in the event of an accident between a vehicle and an electric mobility vehicle, there is a problem that the accident may be fatal to a user who uses the electric mobility vehicle.

SUMMARY

Therefore, it is an aspect of the present disclosure to provide a vehicle control system and method capable of adjusting an inter-vehicle distance between a vehicle and an electric mobility vehicle to minimize the number of accidents with the electric mobility vehicle.

Additional aspects of the disclosure will be set forth in part in the description which follows and, in part, will be obvious from the description, or may be learned by practice of the disclosure.

In accordance with one aspect of the present disclosure, a vehicle control method includes detecting an electric mobility vehicle around a host vehicle to control an inter-vehicle distance between the host vehicle driven by a driver and the electric mobility vehicle, upon detecting the electric mobility vehicle, determining whether the electric mobility vehicle is present in a region of interest, and controlling the host vehicle to maintain a target inter-vehicle distance to the electric mobility vehicle.

The vehicle control method may further include, upon the electric mobility vehicle being present in the region of interest, determining whether the electric mobility vehicle is present in a host vehicle lane in which the host vehicle travels, and upon the electric mobility vehicle being present in the host vehicle lane of the host vehicle, determining the target inter-vehicle distance to the electric mobility vehicle, wherein the controlling of the host vehicle includes controlling the host vehicle according to the determined target inter-vehicle distance to the electric mobility vehicle.

The determining of the target inter-vehicle distance to the electric mobility vehicle may include measuring a size of the electric mobility vehicle, and determining the target inter-vehicle distance to the electric mobility vehicle according to the measured size of the electric mobility vehicle.

The determining of the target inter-vehicle distance to the electric mobility vehicle may include determining the target inter-vehicle distance to the electric mobility vehicle such that the target inter-vehicle distance to the electric mobility vehicle increases as the measured size of the electric mobility vehicle decreases.

The vehicle control method may further include, upon the electric mobility vehicle being not present in the host vehicle lane of the host vehicle, controlling the host vehicle to maintain an existing target inter-vehicle distance.

The vehicle control method may further include, upon the electric mobility vehicle being present in the region of interest, issuing a warning to the driver of the host vehicle.

The region of interest may be formed to have a certain width in a forward direction in which the vehicle travels.

A longitudinal distance of interest of the region of interest may be set to be proportional to a speed of the host vehicle.

A lateral distance of interest of the region of interest may be set according to a lateral distance between the host vehicle and the electric mobility vehicle.

The vehicle control method may further include, upon the electric mobility vehicle being not present in the region of interest, controlling the host vehicle to maintain an existing target inter-vehicle distance.

In accordance with another aspect of the present disclosure, a vehicle control system includes a sensor configured to detect an electric mobility vehicle around a host vehicle to control an inter-vehicle distance between the host vehicle driven by a driver and the electric mobility vehicle, and a processor configured to determine a target inter-vehicle distance to the electric mobility vehicle and control the host vehicle to maintain the target inter-vehicle distance to the electric mobility vehicle, wherein the processor controls the host vehicle after determining whether the electric mobility vehicle is present in a region of interest.

Upon the electric mobility vehicle being present in the region of interest, the processor may determine whether the electric mobility vehicle is present in a host vehicle lane in which the host vehicle travels, and upon the electric mobility vehicle being present in the host vehicle lane of the host vehicle, the processor may determine the target inter-vehicle distance to the electric mobility vehicle and may control the host vehicle according to the determined target inter-vehicle distance to the electric mobility vehicle.

The processor may measure a size of the electric mobility vehicle detected by the sensor and may determine the target inter-vehicle distance to the electric mobility vehicle according to the measured size of the electric mobility vehicle.

The processor may determine the target inter-vehicle distance to the electric mobility vehicle such that the target inter-vehicle distance to the electric mobility vehicle increases as the measured size of the electric mobility vehicle decreases.

Upon the electric mobility vehicle being not present in the host vehicle lane of the host vehicle, the processor may control the host vehicle to maintain an existing target inter-vehicle distance.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
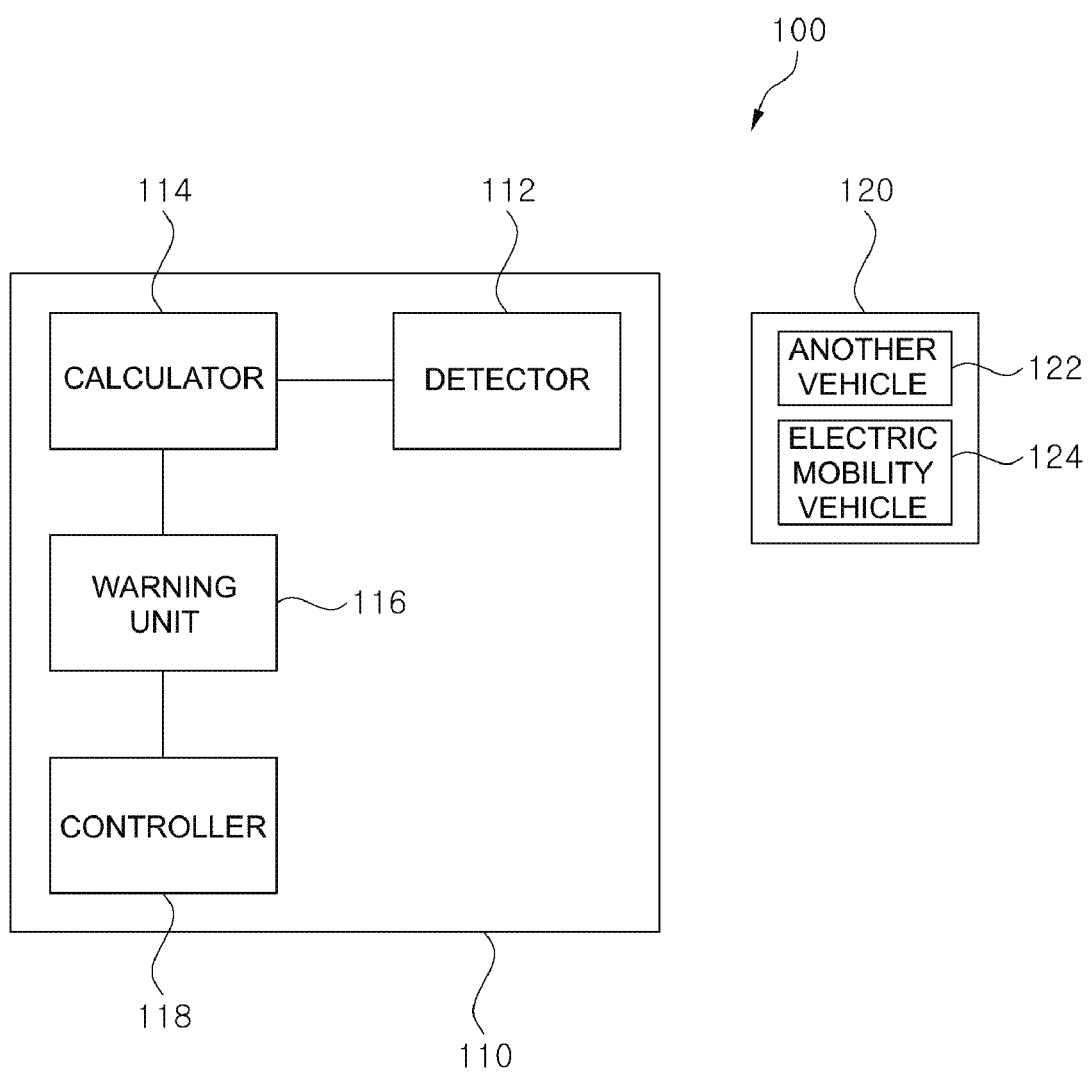
FIG. 1 is a block diagram illustrating a vehicle control system according to one embodiment of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, embodiments of the present disclosure will be described in detail with reference to the accompanying drawings. Embodiments described below are exemplarily provided to sufficiently inform those skilled in the art of the spirit of the present disclosure. Rather than being limited to the embodiments described below, the present disclosure may be implemented in other forms. Further, for clear illustration of the present disclosure, parts unrelated to the description are not shown in the drawings, and the widths, lengths, and thicknesses of elements shown in the drawings may be exaggerated for ease of description. Like reference numerals refer to like elements throughout the specification.

A vehicle control system 100 according to one embodiment of the present disclosure will be described with reference to FIGS. 1 to 9. The vehicle control system 100 according to one embodiment of the present disclosure may control an inter-vehicle distance such that an accident between a host vehicle 110 driven by a driver and a target mobility vehicle 120 does not occur. The vehicle control system 100 according to one embodiment of the present disclosure includes the host vehicle 110 and the target mobility vehicle 120.

Figure 2:
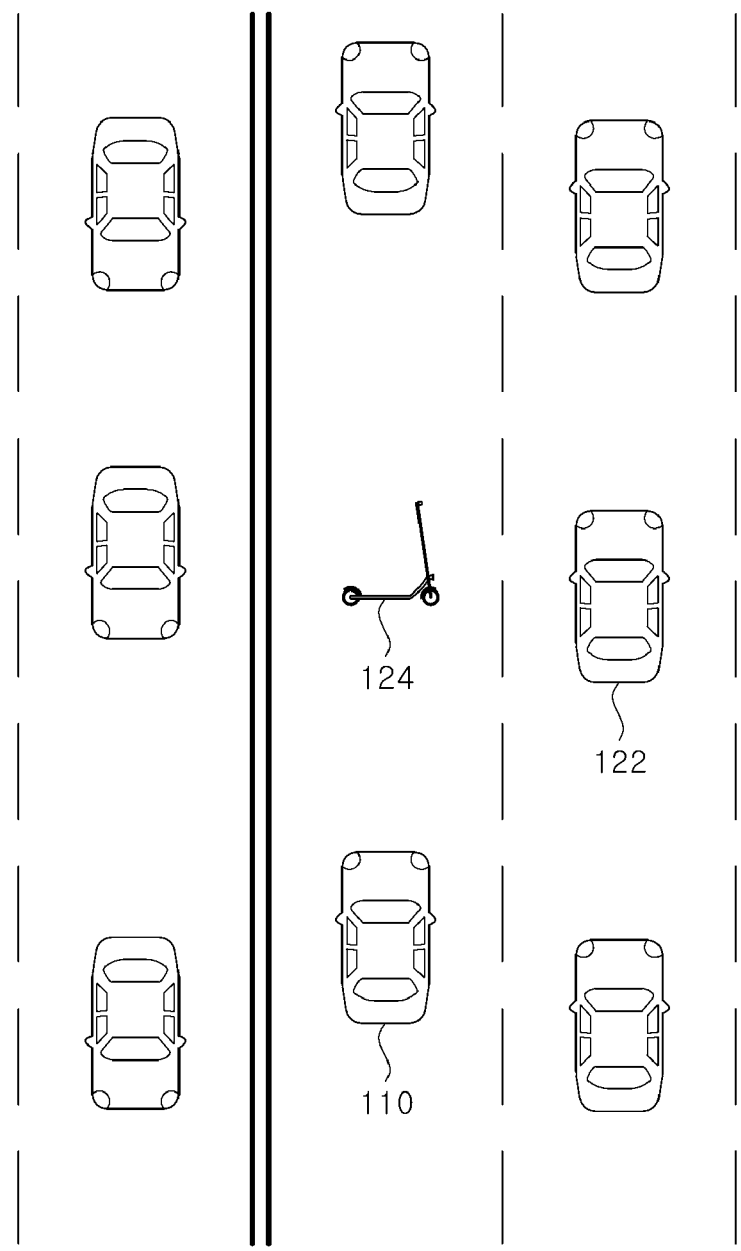
FIG. 2 is a diagram illustrating a state in which a host vehicle and a target mobility vehicle travel on a road in the vehicle control system according to one embodiment of the present disclosure.
Figure 3:
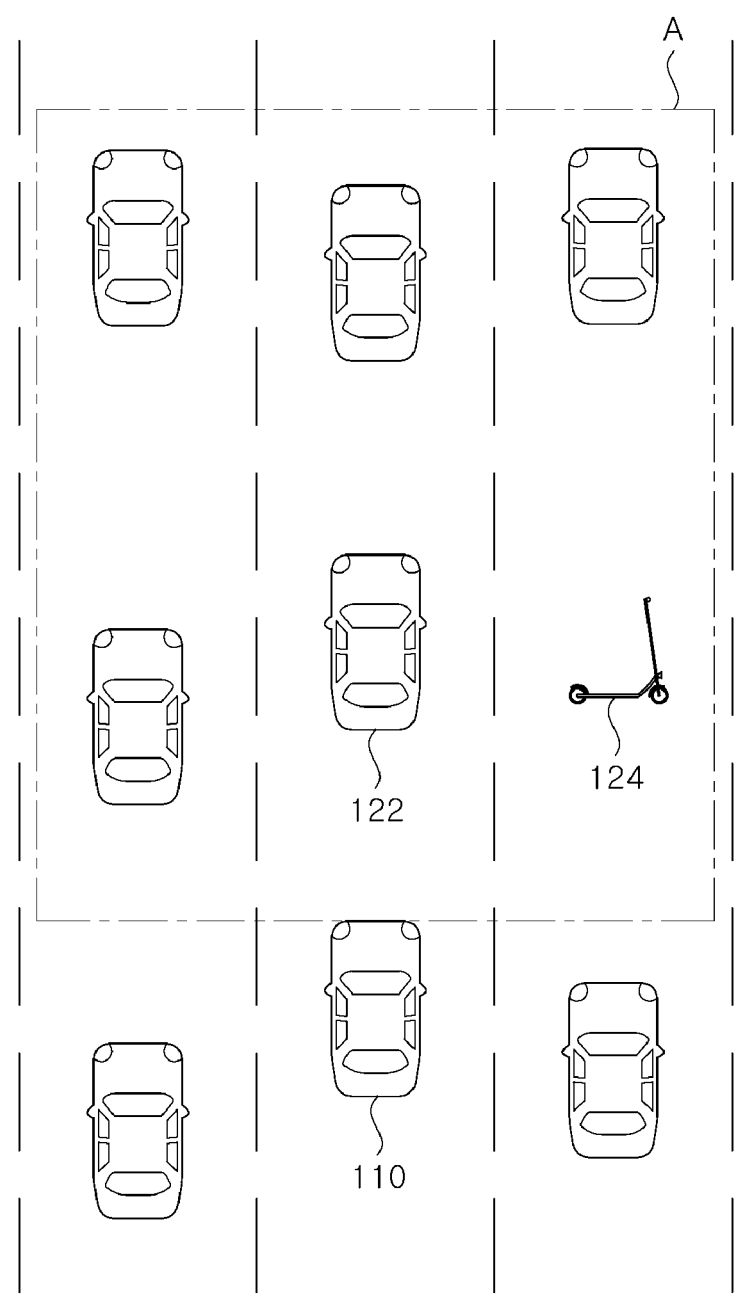
FIG. 3 is a diagram for describing that the host vehicle sets a region of interest on a road in the vehicle control system according to one embodiment of the present disclosure.

The host vehicle 110 may be a vehicle driven by a driver and may be driven while maintaining a certain distance from various target mobility vehicles 120 on a road. In the case of autonomous driving, as shown in FIG. 2, the host vehicle 110 may be moved while maintaining a lane and may be driven while maintaining a certain inter-vehicle distance to a target mobility vehicle located in front.

The target mobility vehicle 120 is driven on a road along with the host vehicle 110. In the present embodiment, the target mobility vehicle 120 includes an electric mobility vehicle 124 and another general vehicle 122. Another vehicle 122 may be a general passenger car or truck like the host vehicle 110, and the electric mobility vehicle 124 may be an electric wheel, an electric kickboard, an electric skateboard, an electric bicycle, or the like.

In the vehicle control system 100 according to the present embodiment, the host vehicle 110 may control an inter-vehicle distance to the target mobility vehicle 120 as described above and may control an inter-vehicle distance to the electric mobility vehicle 124 among the target mobility vehicles 120. To this end, the host vehicle 110 includes a detector 112, a calculator 114, a warning unit 116, and a controller 118. The detector 112, the calculator 114, the warning unit 116, and the controller 118 do not correspond to essential components of the host vehicle 110, and at least some of the detector 112, the calculator 114, the warning unit 116, and the controller 118 may be omitted.

The detector 112 may detect the target mobility vehicle 120 that precedes the host vehicle 110 and may include a camera, a laser induced detection and ranging (LiDAR) sensor, a radar sensor, and the like. The detector 112 may detect the target mobility vehicle 120 that is driven ahead of the host vehicle 110 and may transmit a detected signal to the calculator 114. As shown in FIG. 2, the detector 112 may detect one or more target mobility vehicles 120 that precede the host vehicle 110.

The determinor 114 determines a distance to the electric mobility vehicle 124 detected by the detector 112 and also measures a size of the target mobility vehicle 120. Here, the size of the electric mobility vehicle 124 may be a relative size with respect to the host vehicle 110. In addition, upon the electric mobility vehicle 124 being present in a host vehicle lane, the calculator 114 may determine an target inter-vehicle distance between the electric mobility vehicle 124 and the host vehicle 110.

Figure 5:
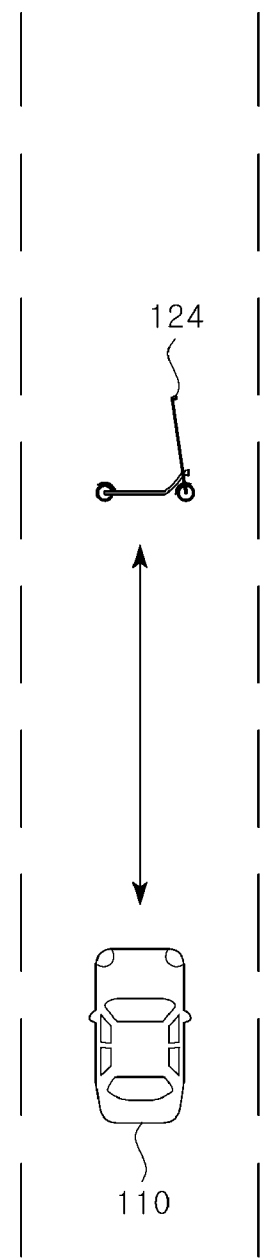
FIG. 5 is a diagram illustrating an inter-vehicle distance between the host vehicle and an electric mobility vehicle in the vehicle control system according to one embodiment of the present disclosure.
Figure 6:
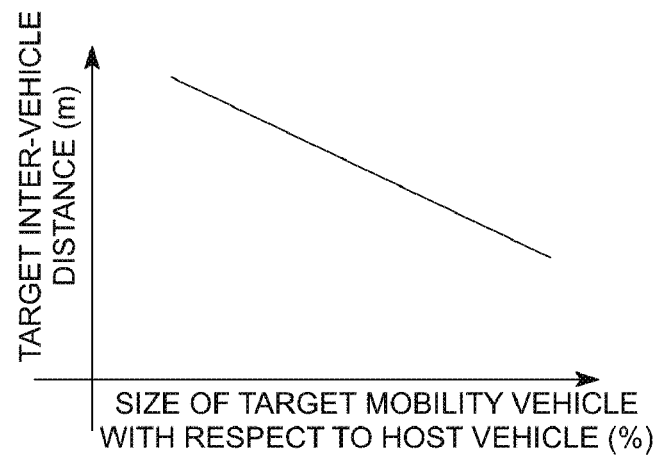
FIG. 6 is a graph showing a target inter-vehicle distance according to a size of a target mobility vehicle with respect to the host vehicle in the vehicle control system according to one embodiment of the present disclosure.

That is, as shown in FIG. 5, upon the electric mobility vehicle 124 preceding the host vehicle 110 in a host vehicle lane in which the host vehicle 110 is driven, the calculator 114 determines an target inter-vehicle distance between the electric mobility vehicle 124 and the host vehicle 110. Here, the calculator 114 determines the size of the preceding electric mobility vehicle 124 and determines the relative size of the electric mobility vehicle 124 according to a size of the host vehicle 110. Therefore, as shown in FIG. 6, the calculator 114 may determine an target inter-vehicle distance such that the target inter-vehicle distance to the preceding electric mobility vehicle 124 increases as the size of the preceding electric mobility vehicle 124 decreases.

Figure 4:
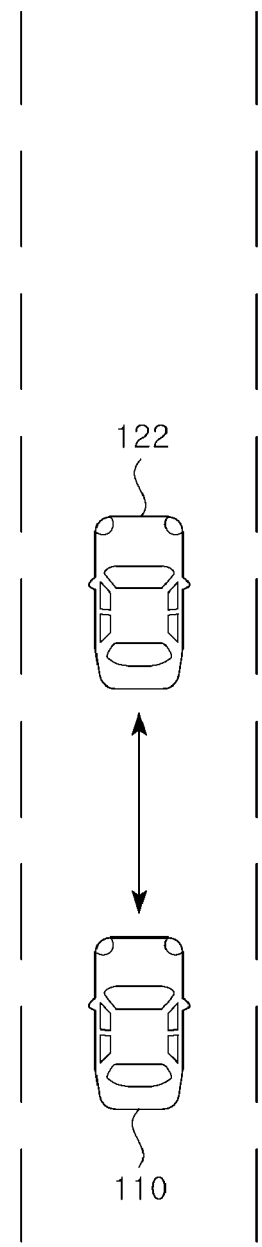
FIG. 4 is a diagram illustrating an inter-vehicle distance between the host vehicle and another vehicle in the vehicle control system according to one embodiment of the present disclosure.

In addition, as shown in FIG. 4, even when another vehicle 122 is present in a host vehicle lane, the calculator 114 determines an target inter-vehicle distance between another vehicle 122 and the host vehicle 110. That is, the calculator 114 may determine a distance to another vehicle 122 that precedes in the host vehicle lane in which the host vehicle 110 is driven and may transmit the determined distance to the controller 118. If necessary, the calculator 114 does not separately determine an target inter-vehicle distance to another vehicle 122 preceding in the host vehicle lane, and the controller 118 may perform control according to a separately stored target inter-vehicle distance.

The calculator 14 may be implemented as a processor and/or memory together with the controller 118. The memory may store programs and data for implementing the operation of the calculator 114. The processor may process data according to the programs stored in the memory.

Upon the electric mobility vehicle 124 being located in a region of interest A set by the controller 118, the warning unit 116 issues a warning to a driver who drives the host vehicle 110. The warning unit 116 may display the electric mobility vehicle 124 being located in the region of interest A on a display installed in the host vehicle 110 and may also generate a sound.

The controller 118 sets the region of interest A, determines whether the electric mobility vehicle 124 detected by the detector 112 is present in the region of interest A, and controls the warning unit 116 to issue a warning when the electric mobility vehicle 124 being present in the region of interest A. In addition, the controller 118 determines whether the electric mobility vehicle 124 is present and operated in a host vehicle lane in which the host vehicle 110 is driven.

When the electric mobility vehicle 124 is present in the host vehicle lane, the controller 118 may control the host vehicle 110 to maintain an inter-vehicle distance according to an target inter-vehicle distance determined by the calculator 114.

Figure 7:
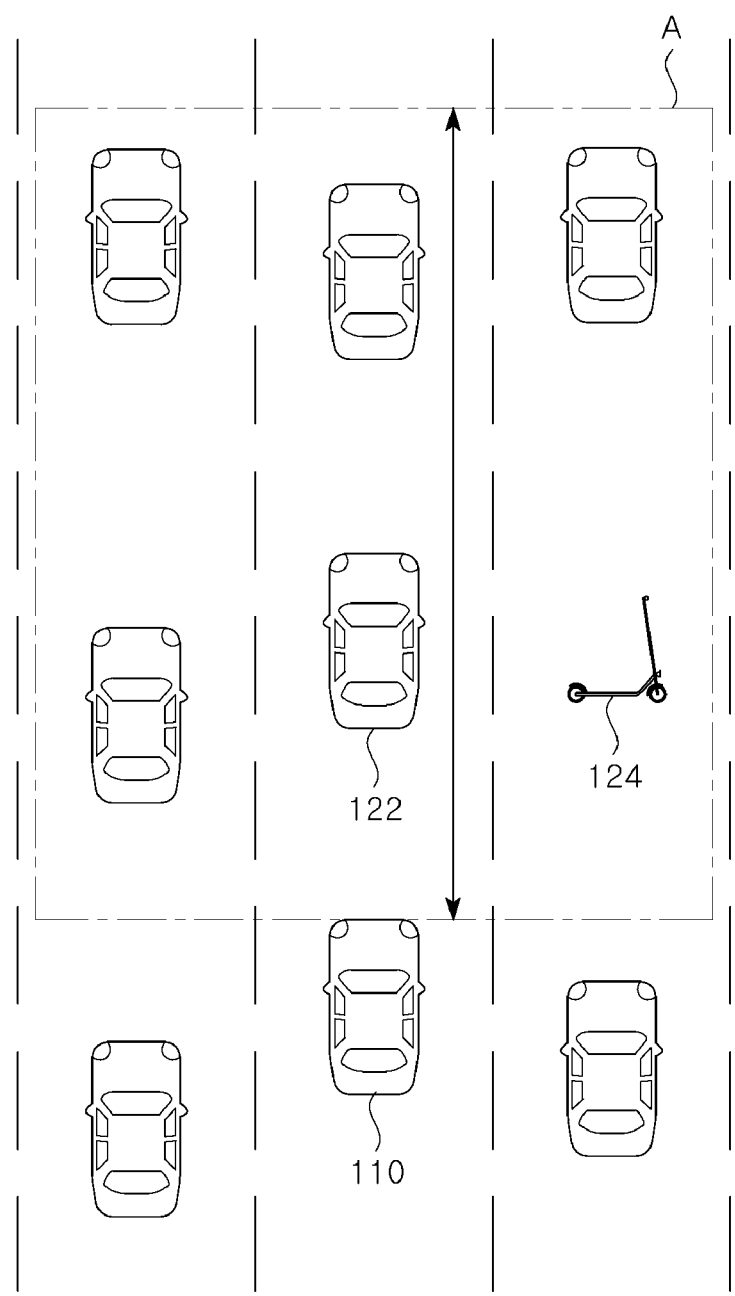
FIG. 7 is a diagram for describing the determinion of a longitudinal region of interest in the vehicle control system according to one embodiment of the present disclosure.
Figure 8:
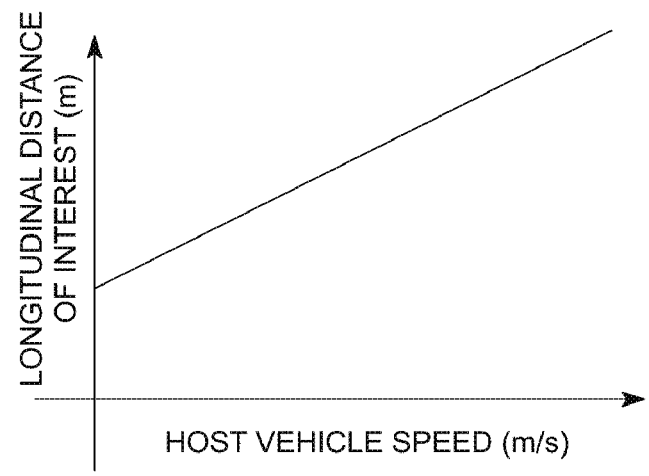
FIG. 8 is a graph showing a longitudinal distance of interest of a region of interest according to a speed of the host vehicle in the vehicle control system according to one embodiment of the present disclosure.

The controller 118 sets the region of interest A for a region in front of the host vehicle 110 which is being driven. A longitudinal distance of interest of the region of interest A may be set to be proportional to a speed of the host vehicle 110. That is, as shown in FIGS. 7 and 8, the longitudinal distance of interest may be set to a value obtained by multiplying a speed of the host vehicle 110 by a reference time and adding a constant thereto. For example, the longitudinal distance of interest may be host vehicle speed [m/s]×T[s]+S[m]. Here, T and S are values that can be changed according to circumstances, and for example, T may be 5 seconds and S may be 30 m.

As described above, the longitudinal distance of interest may increase as a speed of the host vehicle 110 increases and may decrease as the speed of the host vehicle 110 decreases.

Figure 9:
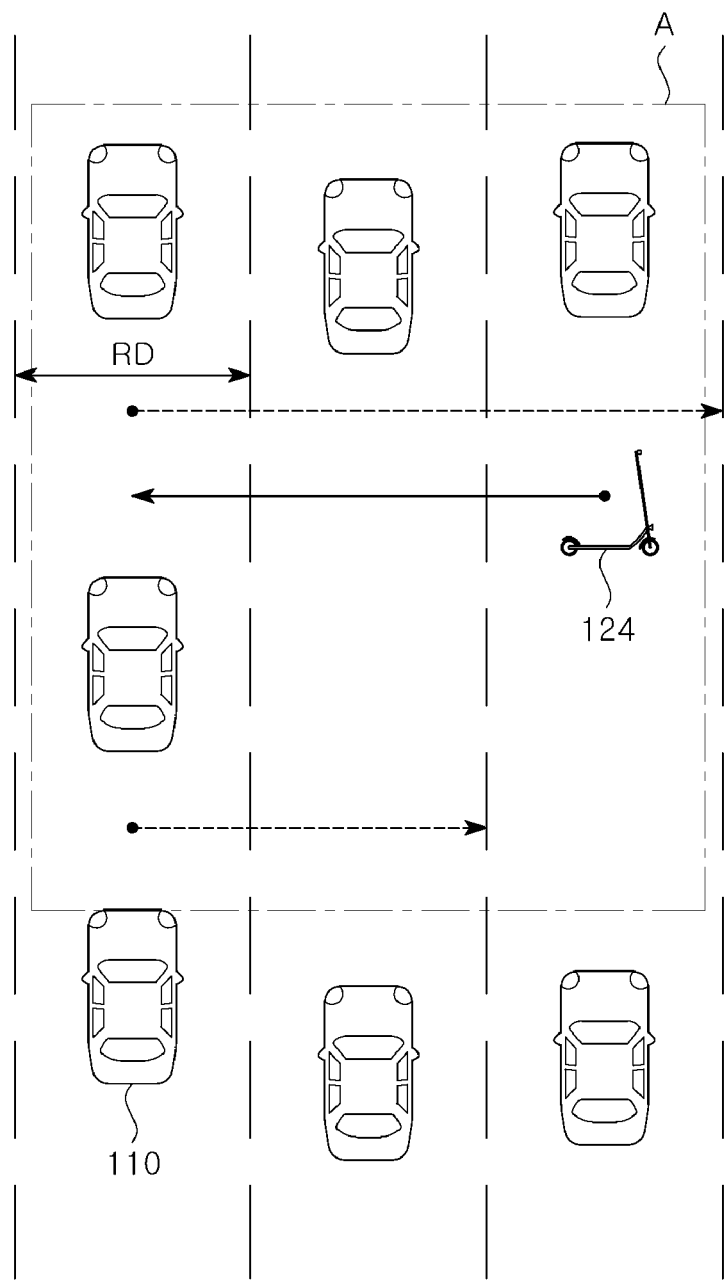
FIG. 9 is a diagram for describing the determinion of a lateral region of interest in the vehicle control system according to one embodiment of the present disclosure.

A lateral distance of interest of the region of interest A may be set in consideration of a lane width RD and a lateral distance to the electric mobility vehicle 124. That is, the lateral distance of interest may be set in consideration of a set time (for example, about 3 seconds) that is a time for the electric mobility vehicle 124 to laterally move. For example, as shown in FIG. 9, a distance to a region spaced two or three lanes from a lane in which the host vehicle 110 is driven may be set as the lateral distance of interest.

In addition, the lateral distance of interest may be set to three times the lane width RD in both directions based on a host vehicle lane in which the host vehicle 110 is driven.

Accordingly, the region of interest A may be set in a quadrangular shape based on the longitudinal distance of interest and the lateral distance of interest. Thus, upon the electric mobility vehicle 124 detected by the detector 112 entering the region of interest A set as described above, the controller 118 controls the warning unit 116 to issue a warning to a driver of the host vehicle 110. Upon the electric mobility vehicle 124 being located in a host vehicle lane of the set region of interest A in which the host vehicle 110 is driven, the controller 118 may control the calculator 114 to measure the size of the electric mobility vehicle 124 and may control the host vehicle 110 to maintain an inter-vehicle distance between the host vehicle 110 and the electric mobility vehicle 124 according to an target inter-vehicle distance determined according to the measured size of the electric mobility vehicle 124.

The controller 18 may be implemented as a processor and/or memory together with the calculator 114. The memory may store programs and data for implementing the operation of the controller 118. The processor may process data according to the programs stored in the memory.

Figure 10:
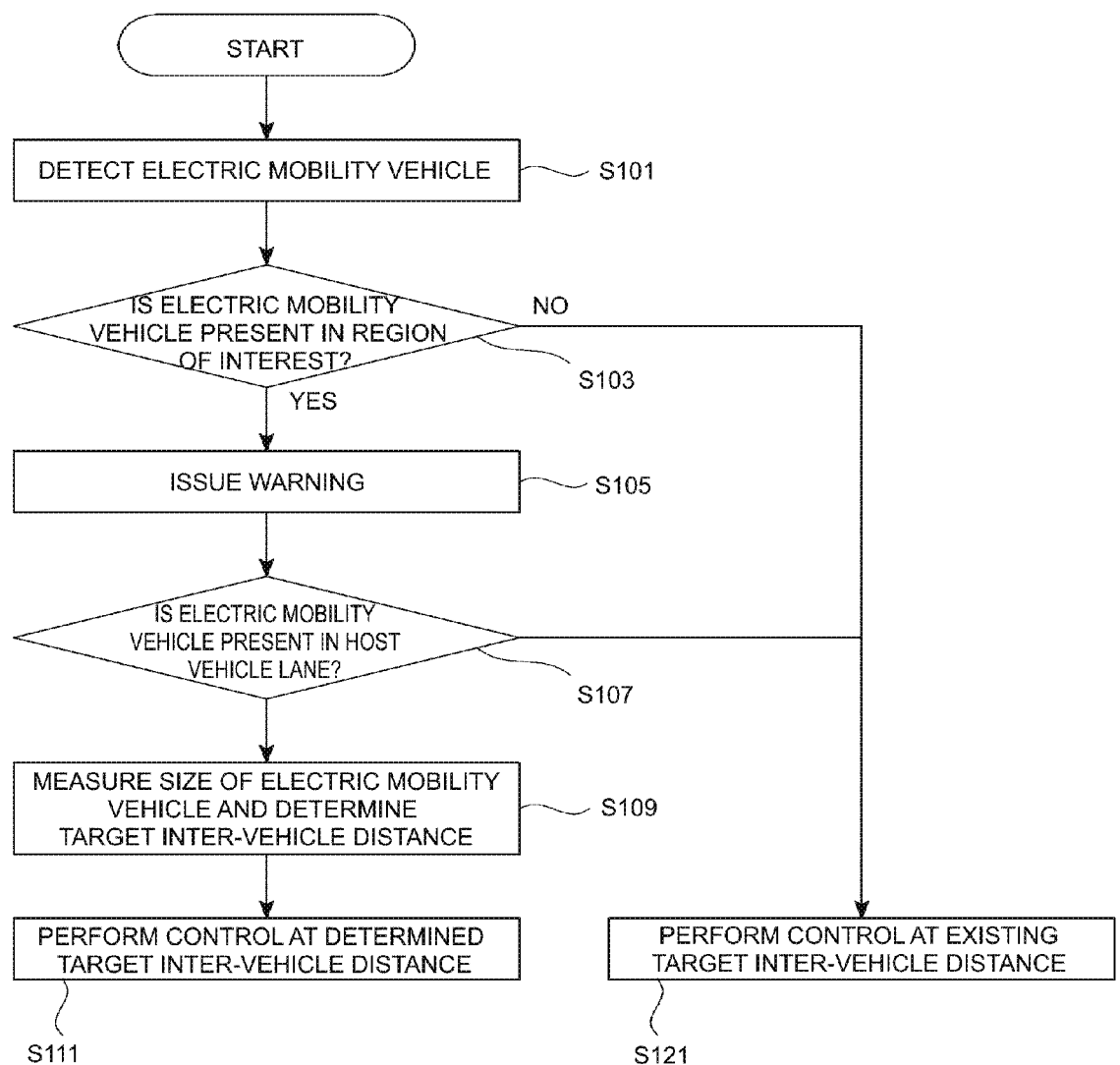
FIG. 10 is a flowchart for describing a vehicle control method according to one embodiment of the present disclosure.

A vehicle control method according to one embodiment of the present disclosure will be described with reference to FIG. 10. When the vehicle control method according to one embodiment of the present disclosure is described, the vehicle control method will be described with reference to the drawings shown in FIGS. 1 to 9.

An electric mobility vehicle 124 is detected (101).

A detector 112 detects whether the electric mobility vehicle 124 is present among target mobility vehicles 120 that precede a host vehicle 110. The detector 112 may include a camera, a LiDAR sensor, a radar sensor, and the like and may detect the electric mobility vehicle 124 that precedes the host vehicle 110. Also, if necessary, the detector 112 may detect whether the electric mobility vehicle 124 is present in a lateral direction or in the rear of the host vehicle 110.

Here, the detector 112 may interwork with a controller 118 or a calculator 114 to detect the type of electric mobility vehicle 124, and furthermore, may detect a bike being ridden on a road other than the electric mobility vehicle 124.

It is determined whether the electric mobility vehicle 124 is present in a region of interest A (103).

The controller 118 determines whether the electric mobility vehicle 124 enters the region of interest A set by the controller 118. The controller 118 determines whether the electric mobility vehicle 124 detected by the detector 112 enters the region of interest A and is present therein. The region of interest A is a region having a certain area in front of the host vehicle 110 driven by a driver.

The region of interest A is set with a longitudinal distance of interest in a direction in which the host vehicle 110 is driven and a lateral distance of interest in a direction perpendicular to the direction in which the host vehicle 110 is driven. The longitudinal distance of interest may be set to be proportional to a speed of the host vehicle 110. That is, as shown in FIGS. 7 and 8, the longitudinal distance of interest may be set to a value obtained by multiplying a speed of the host vehicle 110 by a reference time and adding a constant thereto. For example, the longitudinal distance of interest may be host vehicle speed [m/s]×T[s]+S[m]. Here, T and S are values that can be changed according to circumstances, and for example, T may be 5 seconds and S may be 30 m. As described above, the longitudinal distance of interest may increase as a speed of the host vehicle 110 increases and may decrease as the speed of the host vehicle 110 decreases.

The lateral distance of interest may be set in consideration of a lane width RD and a lateral distance to the electric mobility vehicle 124. That is, the lateral distance of interest may be set in consideration of a set time (for example, about 3 seconds) that is a time for the electric mobility vehicle 124 to laterally move. For example, as shown in FIG. 9, a distance to a region spaced two or three lanes from a lane in which the host vehicle 110 is driven may be set as the lateral distance of interest.

In addition, the lateral distance of interest may be set to three times the lane width RD in both directions based on a host vehicle lane in which the host vehicle 110 is driven.

Upon the electric mobility vehicle 124 being present in the region of interest A, a warning is issued to the driver who drives the host vehicle 110 (105).

In operation 103, upon the electric mobility vehicle 124 being present in the region of interest A, the controller 118 controls a warning unit 116 to issue a warning to notify the driver that the electric mobility vehicle 124 is present in the region of interest A. The warning unit 116 may display the electric mobility vehicle 124 being located in the region of interest A on a display installed in the host vehicle 110 and also may generate a sound.

It is determined whether the electric mobility vehicle 124 is present in the host vehicle lane (107).

The controller 118 determines whether the electric mobility vehicle 124 is present in the host vehicle lane in which the host vehicle 110 is driven. Here, the controller 118 determines whether the electric mobility vehicle 124 is located in the host vehicle lane in the region of interest A. Here, the controller 118 determines whether the electric mobility vehicle 124 is located in front of the host vehicle 110. Here, whether the electric mobility vehicle 124 is present in the host vehicle lane includes a case in which the electric mobility vehicle 124 is present directly in front of the host vehicle 11 as shown in FIG. 5 and may also include a case in which another vehicle is present between the electric mobility vehicle 124 and the host vehicle 110.

Upon the electric mobility vehicle 124 being present in the host vehicle lane, a size of the electric mobility vehicle 124 is measured, and an target inter-vehicle distance to the electric mobility vehicle 124 is determined (109).

Upon the electric mobility vehicle 124 preceding in the host vehicle lane in which the host vehicle 110 is driven, the target inter-vehicle distance between the electric mobility vehicle 124 and the host vehicle 110 is determined. Here, the size of the preceding electric mobility vehicle 124 is first determined, and a relative size of the electric mobility vehicle 124 according to a size of the host vehicle 110 is determined to determine the target inter-vehicle distance such that the target inter-vehicle distance to the preceding electric mobility vehicle 124 increases as the size of the preceding electric mobility vehicle 124 decreases. In the present operation, the calculator 114 may determine the size of the electric mobility vehicle 124 and the target inter-vehicle distance to the electric mobility vehicle 124.

The host vehicle 110 is controlled based on the determined target inter-vehicle distance (111).

When the target inter-vehicle distance to the preceding electric mobility vehicle 124 is determined in operation 109, the controller 118 controls the host vehicle 110 such that an inter-vehicle distance between the host vehicle 110 and the electric mobility vehicle 124 becomes the target inter-vehicle distance determined in operation 109. Here, as shown in FIGS. 4 and 5, the controller 118 may perform control such that the inter-vehicle distance between the host vehicle 110 and the preceding electric mobility vehicle 124 is longer than an inter-vehicle distance between the host vehicle 110 and another preceding vehicle 122.

The host vehicle 110 is controlled based on an existing target inter-vehicle distance (121).

In operation 103, upon the electric mobility vehicle 124 being not present in the region of interest A, the controller 118 controls the host vehicle 110 to travel at the existing target inter-vehicle distance to another vehicle 122. In addition, in operation 107, upon the electric mobility vehicle 124 being not present in the host vehicle lane, the controller 118 controls the host vehicle 110 to travel at the existing target inter-vehicle distance to another vehicle 122.

According to embodiments of the present disclosure, when an electric mobility vehicle capable of quickly turning enters a region of interest, a warning is issued to a driver, thereby allowing the driver to avoid an accident with the electric mobility vehicle.

In addition, when an electric mobility vehicle enters a region of interest, a safe distance to the electric mobility vehicle is adjusted to be longer than a safe distance to other vehicles, thereby preventing an accident with the electric mobility vehicle.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A vehicle control method comprising:
    detecting an electric mobility vehicle around a host vehicle to control an inter-vehicle distance between the host vehicle driven by a driver and the electric mobility vehicle;
    determining whether the electric mobility vehicle is present in a region of interest, based on detecting the electric mobility vehicle;
    determining whether the electric mobility vehicle is present in a host vehicle lane in which the host vehicle travels based on the electric mobility vehicle being present in the region of interest;
    measuring a relative size of the electric mobility vehicle according to a size of the host vehicle and determining a target inter-vehicle distance to the electric mobility vehicle such that the target inter-vehicle distance to the electric mobility vehicle becomes longer as the size of the electric mobility vehicle becomes smaller, based on the electric mobility vehicle being present in the host vehicle lane; and
    controlling the host vehicle to maintain the target inter-vehicle distance to the electric mobility vehicle based on the relative size.

2. The vehicle control method of claim 1, further comprising controlling the host vehicle to maintain an existing target inter-vehicle distance, based on the electric mobility vehicle being not present in the host vehicle lane of the host vehicle.

3. The vehicle control method of claim 1, further comprising issuing a warning to the driver of the host vehicle, based on the electric mobility vehicle being present in the region of interest.

4. The vehicle control method of claim 1, wherein the region of interest is formed to have a certain width in a forward direction in which the vehicle travels.

5. The vehicle control method of claim 1, wherein a longitudinal distance of interest of the region of interest is set to be proportional to a speed of the host vehicle.

6. The vehicle control method of claim 1, wherein a lateral distance of interest of the region of interest is set according to a lateral distance between the host vehicle and the electric mobility vehicle.

7. The vehicle control method of claim 1, further comprising controlling the host vehicle to maintain an existing target inter-vehicle distance, based on the electric mobility vehicle being not present in the region of interest.

8. A vehicle control system comprising:
    a sensor configured to detect an electric mobility vehicle around a host vehicle to control an inter-vehicle distance between the host vehicle driven by a driver and the electric mobility vehicle; and
    a processor configured to determine a target inter-vehicle distance to the electric mobility vehicle and control the host vehicle to maintain the target inter-vehicle distance to the electric mobility vehicle,
    wherein the processor controls the host vehicle after determining whether the electric mobility vehicle is present in a region of interest, determines whether the electric mobility vehicle is present in a host vehicle lane in which the host vehicle travels based on the electric mobility vehicle being present in the region of interest, measures a relative size of the electric mobility vehicle according to a size of the host vehicle based on the electric mobility vehicle being present in the host vehicle lane, determines the target inter-vehicle distance to the electric mobility vehicle such that the target inter-vehicle distance to the electric mobility vehicle becomes longer as the size of the electric mobility vehicle becomes smaller, and controls the host vehicle to maintain the target inter-vehicle distance to the electric mobility vehicle based on the relative size.

9. The vehicle control system of claim 8, wherein the processor controls the host vehicle to maintain an existing target inter-vehicle distance, based on the electric mobility vehicle being not present in the host vehicle lane of the host vehicle.

10. The vehicle control system of claim 8, wherein the processor issues a warning to the driver of the host vehicle, based on the electric mobility vehicle being present in the region of interest.

11. The vehicle control system of claim 8, wherein the region of interest is formed to have a certain width in a forward direction in which the vehicle travels.

12. The vehicle control system of claim 8, wherein a longitudinal distance of interest of the region of interest is set to be proportional to a speed of the host vehicle.

13. The vehicle control system of claim 8, wherein a lateral distance of interest of the region of interest is set according to a lateral distance between the host vehicle and the electric mobility vehicle.

14. The vehicle control system of claim 8, wherein the processor controls the host vehicle to maintain an existing target inter-vehicle distance, based on the electric mobility vehicle being not present in the region of interest.

* * * * *